(12) United States Patent
Olien et al.

(10) Patent No.: US 10,698,491 B2
(45) Date of Patent: Jun. 30, 2020

(54) PRESSURE-SENSITIVE SUSPENSION SYSTEM FOR A HAPTIC DEVICE

(71) Applicant: Immersion Corporation, San Jose, CA (US)

(72) Inventors: Neil Olien, Montreal (CA); Vahid Khoshkava, Montreal (CA)

(73) Assignee: IMMERSION CORPORATION, San Jose, CA (US)

( * ) Notice: Subject to any disclaimer, the term of this patent is extended or adjusted under 35 U.S.C. 154(b) by 0 days.

(21) Appl. No.: 16/383,761

(22) Filed: Apr. 15, 2019

(65) Prior Publication Data

US 2019/0243452 A1 Aug. 8, 2019

Related U.S. Application Data

(63) Continuation of application No. 15/389,351, filed on Dec. 22, 2016, now Pat. No. 10,275,032.

(51) Int. Cl.

| *G06F 3/01* | (2006.01) |
|---|---|
| *G06F 3/041* | (2006.01) |
| *G06F 3/045* | (2006.01) |
| *G06F 3/0354* | (2013.01) |
| *C09D 11/52* | (2014.01) |

(52) U.S. Cl.
CPC .............. *G06F 3/016* (2013.01); *C09D 11/52* (2013.01); *G06F 3/03547* (2013.01); *G06F 3/041* (2013.01); *G06F 3/045* (2013.01); *G06F 3/0414* (2013.01); *G06F 2203/04105* (2013.01)

(58) Field of Classification Search
CPC ........ G06F 3/016; G06F 3/041; G06F 3/0414; G06F 2203/04105; G06F 3/045; G06F 3/03547; C09D 11/52
See application file for complete search history.

(56) References Cited

U.S. PATENT DOCUMENTS

| 3,128,999 A | 4/1964 | Schmitt |
| 3,806,471 A | 4/1974 | Mitchell |
| 4,556,130 A | 12/1985 | Puszakowski |

(Continued)

FOREIGN PATENT DOCUMENTS

| CN | 102221889 A | 10/2011 |
| CN | 202094851 U | 12/2011 |

(Continued)

OTHER PUBLICATIONS

Search Report dated Apr. 11, 2018 in corresponding European Patent Application No. 17209767.

*Primary Examiner* — Stephen G Sherman
(74) *Attorney, Agent, or Firm* — Medler Ferro Woodhouse & Mills PLLC

(57) ABSTRACT

Embodiments hereof are directed to a haptic device having a pressure-sensitive suspension system. The haptic device includes a housing, a touch surface component mounted to the housing to be movable relative thereto, and a haptic actuator for providing haptic feedback to the touch surface component. At least one suspension component is disposed between the touch surface component and the housing. The suspension component is formed from an elastomer and includes pressure-sensing particles integrated into the elastomer. The pressure-sensing particles are configured to sense pressure applied to the touch surface component.

16 Claims, 7 Drawing Sheets

(56) References Cited

U.S. PATENT DOCUMENTS

| | | | |
|---|---|---|---|
| 5,010,774 A | 4/1991 | Kikuo et al. | |
| 5,335,893 A | 8/1994 | Opp | |
| 5,419,626 A | 5/1995 | Crockett | |
| 5,568,357 A | 10/1996 | Kochis et al. | |
| 5,594,574 A | 1/1997 | Lara et al. | |
| 5,734,373 A | 3/1998 | Rosenberg et al. | |
| 5,751,551 A | 5/1998 | Hileman et al. | |
| 5,765,819 A | 6/1998 | Hummel | |
| 5,965,249 A | 10/1999 | Sutton et al. | |
| 6,744,903 B1 | 6/2004 | Jeon | |
| 6,822,635 B2 | 11/2004 | Shahoian et al. | |
| 6,879,318 B1 | 4/2005 | Chan et al. | |
| 6,882,528 B2 | 4/2005 | Chuang | |
| 6,975,305 B2 | 12/2005 | Yamashita | |
| 7,267,313 B2 | 9/2007 | Krzoska et al. | |
| 7,602,384 B2 | 10/2009 | Rosenberg et al. | |
| 7,616,436 B2 | 11/2009 | Demoss et al. | |
| 7,633,745 B2 | 12/2009 | Sakakibara et al. | |
| 7,835,147 B2 | 11/2010 | Merz et al. | |
| 7,839,639 B2 | 11/2010 | Najbert | |
| 8,061,673 B2 | 11/2011 | Yao | |
| 8,068,337 B2 | 11/2011 | Yao et al. | |
| 8,362,882 B2 | 1/2013 | Huebel et al. | |
| 8,633,916 B2 | 1/2014 | Bernstein et al. | |
| 9,032,804 B2 | 5/2015 | Granado et al. | |
| 9,213,409 B2 | 12/2015 | Redelsheimer et al. | |
| 9,280,205 B2 | 3/2016 | Rosenberg et al. | |
| 9,466,783 B2 | 10/2016 | Olien et al. | |
| 10,275,032 B2 * | 4/2019 | Olien | G06F 3/016 |
| 2002/0180712 A1 | 12/2002 | Sato et al. | |
| 2003/0206202 A1 | 11/2003 | Moriya | |
| 2004/0160422 A1 | 8/2004 | Choi et al. | |
| 2006/0022952 A1 | 2/2006 | Ryynanen | |
| 2006/0023416 A1 | 2/2006 | Chen | |
| 2006/0109254 A1 | 5/2006 | Akieda et al. | |
| 2006/0181517 A1 | 8/2006 | Zadesky et al. | |
| 2008/0055277 A1 | 3/2008 | Takenaka et al. | |
| 2008/0060856 A1 | 3/2008 | Shahoian et al. | |
| 2009/0015549 A1 | 1/2009 | Gelfond et al. | |
| 2009/0250267 A1 * | 10/2009 | Heubel | G06F 3/016 178/18.03 |
| 2009/0267892 A1 | 10/2009 | Faubert | |
| 2009/0303022 A1 * | 12/2009 | Griffin | G06F 3/016 340/407.2 |
| 2010/0045612 A1 | 2/2010 | Mölne | |
| 2010/0117809 A1 | 5/2010 | Dai et al. | |
| 2010/0127140 A1 | 5/2010 | Smith | |
| 2010/0172080 A1 | 7/2010 | Bestle | |
| 2010/0245254 A1 | 9/2010 | Olien et al. | |
| 2011/0032091 A1 | 2/2011 | Park et al. | |
| 2011/0043454 A1 | 2/2011 | Modarres et al. | |
| 2011/0053653 A1 | 3/2011 | Tho et al. | |
| 2011/0080350 A1 | 4/2011 | Almalki et al. | |
| 2011/0164365 A1 | 7/2011 | McClure et al. | |
| 2011/0227849 A1 | 9/2011 | Olien et al. | |
| 2011/0290038 A1 | 12/2011 | Hoshino et al. | |
| 2011/0291996 A1 | 12/2011 | Gao et al. | |
| 2012/0206248 A1 | 8/2012 | Biggs | |
| 2013/0002608 A1 | 1/2013 | Autran | |
| 2013/0044049 A1 | 2/2013 | Biggs et al. | |
| 2013/0100607 A1 | 4/2013 | Ternus et al. | |
| 2014/0028573 A1 | 1/2014 | Olien et al. | |
| 2018/0181200 A1 | 6/2018 | Olien et al. | |

FOREIGN PATENT DOCUMENTS

| | | |
|---|---|---|
| DE | 20019074 U1 | 2/2001 |
| EP | 1691263 A1 | 8/2006 |
| EP | 2876527 A1 | 9/2010 |
| EP | 2224313 A1 | 5/2015 |
| JP | 2006048453 A | 2/2006 |
| JP | 2010244283 A | 10/2010 |
| JP | 2012108402 A | 6/2012 |
| WO | 2004/081776 A1 | 9/2004 |
| WO | 2010/116962 A1 | 10/2010 |
| WO | 2012/002664 A2 | 1/2012 |
| WO | 2012/067370 A2 | 5/2012 |

* cited by examiner

PRESSURE-SENSITIVE SUSPENSION SYSTEM FOR A HAPTIC DEVICE

CROSS-REFERENCE TO RELATED APPLICATIONS

This application is a continuation of prior U.S. application Ser. No. 15/389,351, filed on Dec. 22, 2016, which is hereby incorporated by reference in its entirety for all purposes.

FIELD OF THE INVENTION

The present invention relates generally to components and/or systems which provide haptic feedback to the user, more particularly to touch surfaces and touchscreens which provide haptic feedback to the user.

BACKGROUND OF THE INVENTION

Humans interface with electronic and mechanical devices in a variety of applications, and the need for a more natural, easy-to-use, and informative interface is a constant concern. In the context, humans interface with computer devices for a variety of applications. One such application is interacting with computer-generated environments such as games, simulations, and application programs. Computer input devices such as mice and trackballs are often used to control a cursor within a graphical environment and provide input in these applications. In some interface devices, force feedback or tactile feedback is also provided to the user, collectively known herein as "haptic feedback." For example, haptic versions of joysticks, mice, gamepads, steering wheels, or other types of devices can output forces to the user based on events or interactions occurring within the graphical environment, such as in a game or other application program.

In portable computer or electronic devices, such as laptop computers, mice may be inconvenient or too large to utilize. As a result, more compact devices such as touchpads, which are small rectangular, planar pads provided near the keyboard of the computer, are often used. The touchpads sense the location of a pointing object by any of a variety of sensing technologies, such as capacitive sensors or pressure sensors that detect pressure applied to the touchpad. The user contacts the touchpad most commonly with a fingertip and moves his or her finger on the touchpad to move a cursor displayed in the graphical environment. In other embodiments, the user can operate a stylus in conjunction with the touchpad by pressing the stylus tip on the touchpad and moving the stylus.

Application of force feedback or tactile feedback, commonly collectively known as haptic feedback, to touchpads is known. For example, U.S. Pat. No. 9,280,205 to Rosenberg et al., assigned to the same assignee of the present disclosure and the disclosures of which is herein incorporated by reference in its entirety, discloses a touchpad with at least one actuator coupled thereto that outputs a force to provide a haptic sensation. FIG. 1, which is reproduced from Rosenberg et al., illustrates a touchpad 102 that is directly coupled to a grounded piezo-electric actuator 104 which operates to produce a force on the touchpad when an electrical signal is an input to the actuator. Rosenberg et al. discloses that the touchpad can be coupled only to the actuator, or can be additionally coupled to housing 106 of the computer device at other locations besides the actuators with compliant connections using a material or element such as a spring or foam (not shown in FIG. 1). A compliant connection allows portions of the touchpad to move in response to actuator forces and to convey the haptic sensations to the user more effectively.

There are significant size restraints for components positioned between a touchpad and a housing. A need exists in the art for improved and/or alternative compliant suspension systems for haptic touchpads.

SUMMARY OF THE INVENTION

Embodiments hereof are directed to a haptic device having a pressure-sensitive suspension system. The haptic device includes a housing, a touch surface component mounted to the housing to be movable relative thereto, and a haptic actuator for providing haptic feedback to the touch surface component. At least one suspension component is disposed between the touch surface component and the housing. The suspension component is formed from an elastomer and includes pressure-sensing particles integrated into the elastomer. The pressure-sensing particles are configured to sense pressure applied to the touch surface component.

In another embodiment hereof, the haptic device including a housing, a touch surface component mounted to the housing to be movable relative thereto, and a haptic actuator for moving the touch surface component relative to the housing and thereby providing haptic feedback to the touch surface component. At least one suspension component couples the touch surface component and housings together such that the touch surface component is movable relative to the housing. The suspension component is formed from an elastomer configured to limit movement between the touch surface component and the housing in at least a first direction while also being configured to allow movement of the touch surface component relative to the housing in a second direction. The suspension component further includes pressure-sensing particles integrated into the elastomer. The pressure-sensing particles are configured to sense pressure applied to the touch surface component. The haptic device also includes a processor that is configured to receive a pressure signal from the pressure-sensing particles, that is also configured to determine a location of the pressure applied on the touch surface component in response to the pressure signal and that is also configured to output a haptic control signal to the haptic actuator in response to the pressure signal.

In another embodiment hereof, a compliant suspension system for a haptic device includes a first body and a second body mounted to the first body to be movable relative thereto. At least one suspension component is disposed between the first body and the second body. The suspension component includes an elastomer element having pressure-sensing particles integrated therewith. The pressure-sensing particles are configured to sense pressure applied to the touch surface component.

BRIEF DESCRIPTION OF DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Figure 1:
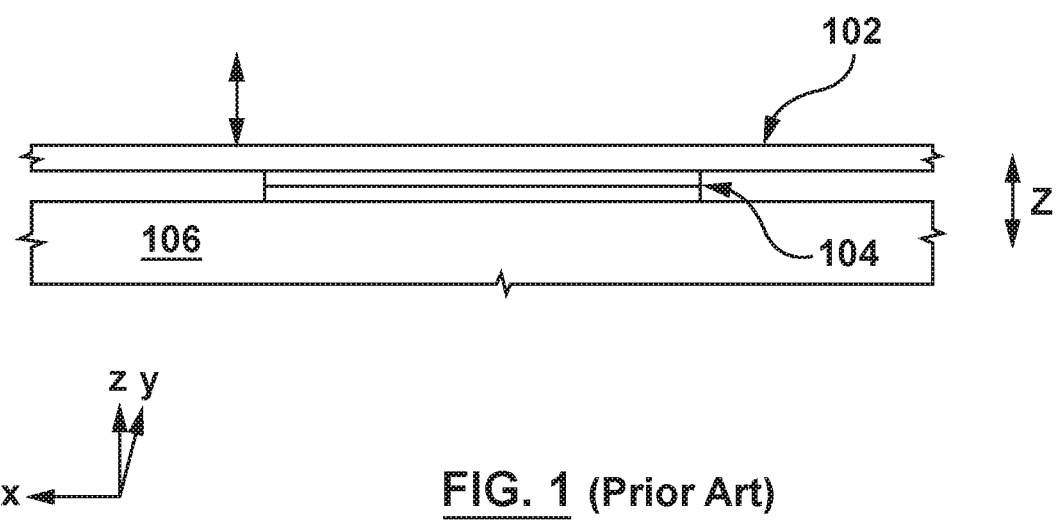
FIG. 1 is a side sectional view of a prior art haptic touchpad.

Specific embodiments of the present invention are now described with reference to the figures, wherein like reference numbers indicate identical or functionally similar elements. The following detailed description is merely exemplary in nature and is not intended to limit the invention or the application and uses of the invention. Although descriptions of embodiments hereof are in the context of a suspension system for an electronic touchpad, the invention may also be used in any other applications where it is deemed useful. Furthermore, there is no intention to be bound by any expressed or implied theory presented in the preceding technical field, background, brief summary or the following detailed description.

Embodiments hereof are directed to a haptic device having a pressure-sensitive suspension system for mounting touchpads, touchscreens and other touch surface components within a housing. The pressure-sensitive suspension system will be described below within the context of a touchpad of a computer wherein the display screen is not co-located with the touch pad. It will be understood, however, that the invention is not limited to suspensions for such touchpads but is equally applicable to any haptically excited touch surface component or touch element. For example, the suspension system might be applied to suspend a touchscreen wherein a display is disposed behind a touch surface. The display may be located behind the touch surface or in a separate location from the touch element and updated by a host computer, or it may simply be a plastic surface with features (e.g. graphics) indicating touch sensitive regions of an associated touch element. Thus, the term "touch surface component" when used in the following detailed description and in the claims should be construed to encompass touchpads and touchscreens as well as any touch surface or touch element and associated graphical element to which haptic effects may be applied.

Pressure-sensitive suspension systems described herein combine pressure-sensing functions into the suspension system as a single integrated component of the haptic device. Thus, a suspension element of the pressure-sensitive suspension system is a single component that serves two distinct functions or has two distinct properties, namely a suspension function or property that allows the touchscreen component to move in response to a haptic actuator for providing haptic effects and also a sensor function or property that senses pressure or touch applied to the touchscreen component. As will be described in more detail herein, the suspension element of the pressure-sensitive suspension system is designed to have the physical properties of a haptics suspension but has the added property of being capable of being used as a sensor at the same time. Advantageously, by integrating the functions of suspension and pressing-sensing into a single component, the total part count of the haptic device is reduced and space concerns or issues for the components of the haptic device are minimized.

Figure 2:
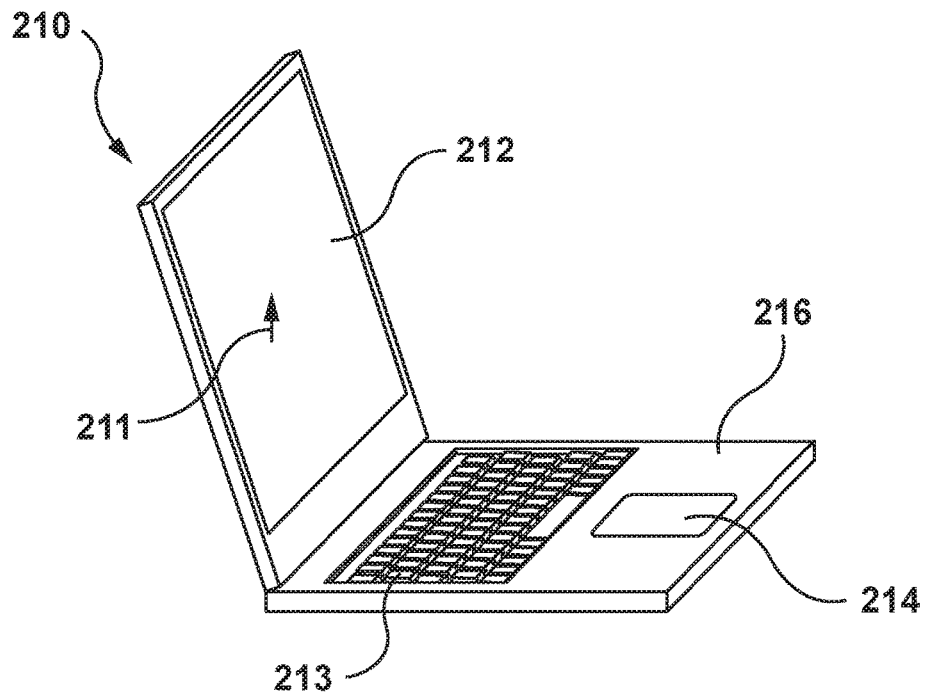
FIG. 2 is a perspective view of a laptop computer having a pressure-sensitive suspension system according to an embodiment hereof.

Turning now to the figures, a pressure-sensitive suspension system according to an embodiment hereof will be described in more detail with respect to FIGS. 2-7. FIG. 2 is a perspective view of a computer 210 including a pressure-sensitive suspension system 220 according to an embodiment hereof. Computer 210 is preferably a portable or laptop computer that can be carried or otherwise transported by the user and may be powered by batteries or other portable energy source in addition to other more stationary power sources. Computer 210 preferably runs one or more host application programs with which a user is interacting via peripherals. Computer 210 includes a housing 216, a display 212 for outputting graphical images to the user, a keyboard 213 for providing character or toggle input from the user to the computer, and a touchpad 214 which is input surface that can translate the motion and position of a user's finger(s) to a relative position on an operating system that is outputted to display 212. Housing 216 is generally considered to be a compartment or casing, but may be any type of housing component. Display 212 is a flat-panel display that is common on laptop computers, or can be any of a variety of types of display devices including a separate monitor. In an embodiment, display 212 can display a graphical environment based on application programs and/or operating systems that are running, such as a graphical user interface (GUI). The graphical environment may include, for example, a cursor 211, backgrounds, windows, data listings, icons such as buttons, and other graphical objects well known in GUI environments. A user interacts with display 212 by touching various regions of touchpad 214 to activate, move, flip, advance, or otherwise manipulate the virtual graphical objects displayed on display 212 and thereby to provide inputs to the device.

The application programs and/or operating systems running on computer 210 may be of a wide variety. For example, the host application program can be a word processor, spreadsheet, video or computer game, drawing program, operating system, graphical user interface, simulation, Web page or browser that implements HTML or VRML instructions, scientific analysis program, virtual reality training program or application, or other application program that utilizes input from touchpad 214 and outputs haptic feedback commands to touchpad 214 as will be explained in more detail herein. For example, many games and other application programs include haptic feedback functionality and may communicate with touchpad 214 using a standard protocol/drivers such as I-Force®, FEELit®, or Touchsense® available from Immersion Corporation of San Jose, Calif.

Other devices may also be incorporated or coupled to computer 210, such as storage devices (hard disk drive, DVD-ROM drive, etc.), network server or clients, game controllers, and the like. In alternate embodiments, computer 210 can take a wide variety of forms, including computing devices that rest on a tabletop or other surface, stand-up arcade game machines, other portable devices or devices worn on the person, handheld or used with a single hand of the user, and other computing devices. For example, computer 210 can be a video game console, personal computer, workstation, a television "set top box" or a "network computer", or other computing or electronic device.

Touchpad 214 includes a planar, rectangular smooth contact surface that can be positioned below keyboard 213 within a recess 215 (see FIG. 4) of housing 216 of computer 210, as shown, or may be positioned at other areas of the housing. The layered structure of touchpad 214 is described in more detail herein with respect to FIG. 9. When the user operates computer 210, the user may conveniently place a fingertip or other object on touchpad 214 and move the fingertip to correspondingly move cursor 211 on display 212. Besides using a finger to contact the touchpad, the user may also hold other objects that directly contact the touchpad. Any haptic sensations output on touchpad 214 can be transmitted through the held object to the user's hand. For example, the user can hold a stylus (not shown) having a point that contacts touchpad 214 more precisely than a finger.

In another embodiment hereof, touchpad 214 can be provided in a separate housing that is connected to a port of computer 210 via a cable or via wireless transmission and which receives force information from and sends position information to computer 210. For example, Universal Serial Bus (USB), Firewire, or a standard serial bus can connect such a touchpad to computer 210. In such an embodiment, computer 210 can be any desktop or stationary computer or device and need not be a portable device.

Figure 3:
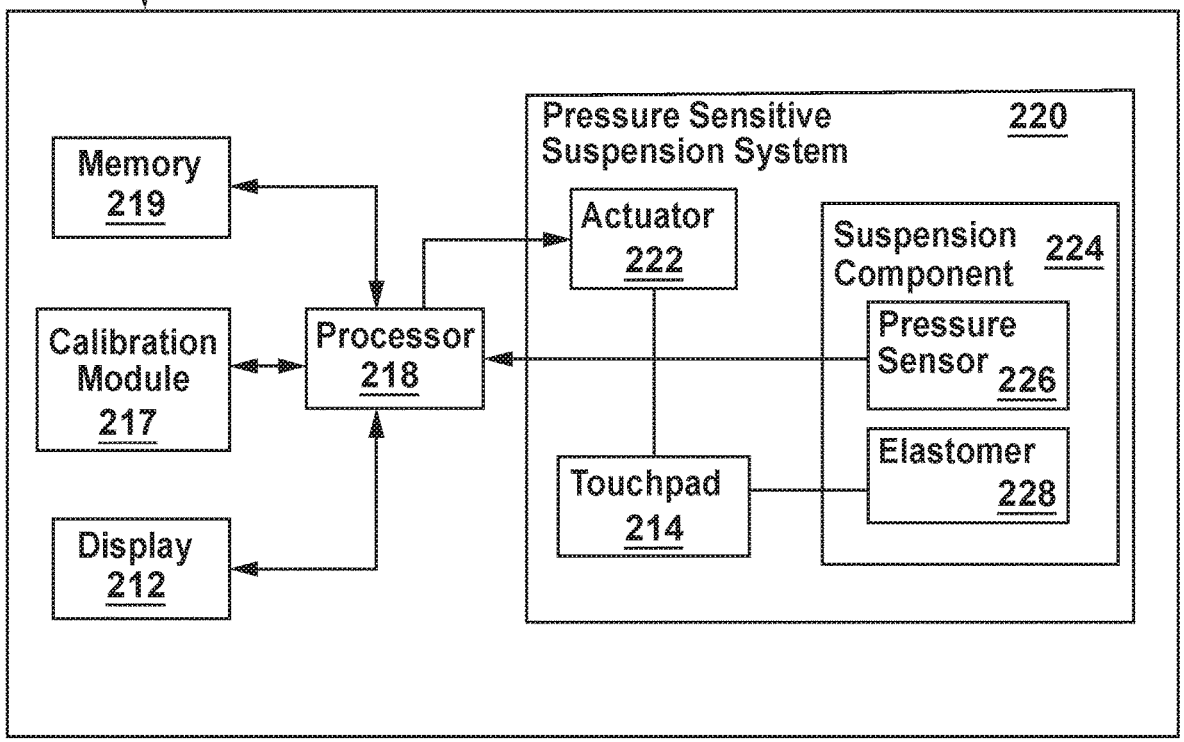
FIG. 3 is a block diagram of the laptop computer of FIG. 2.
Figure 4:
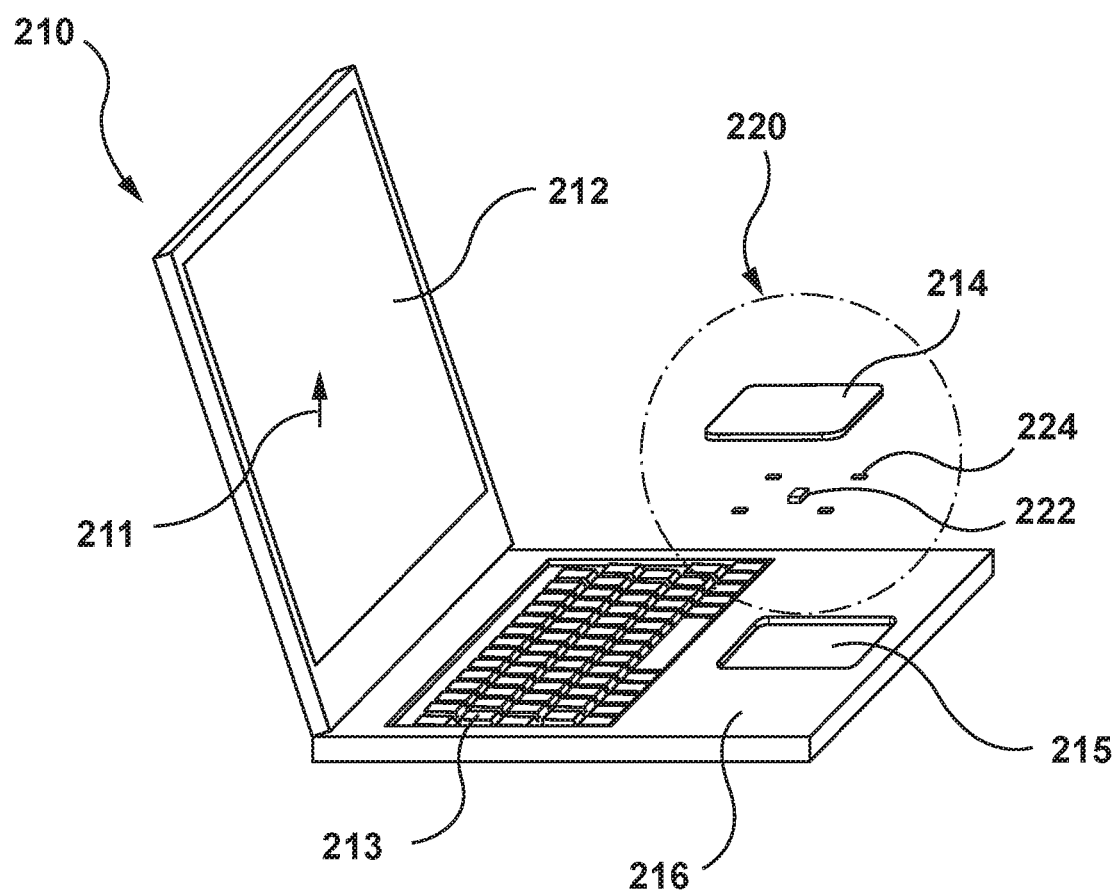
FIG. 4 is an exploded perspective view of the laptop computer of FIG. 2.

FIG. 3 is a block diagram of laptop computer 210, and FIG. 4 is an exploded perspective view of laptop computer 210. As shown in FIGS. 3 and 4, pressure-sensitive suspension system 220 includes a plurality of suspension components 224, touchpad 214, and a haptic actuator 222. Each suspension component 224 combines pressure-sensing particles 226 into an elastomer 228 as a single component. Due to elastomer 228, suspension component 224 has a suspension function or property to mount or couple touchpad 214 to housing 216 to be movable relative thereto. Due to pressure-sensing particles 226 incorporated or integrated therein, suspension component 224 also has a sensor function or property to sense pressure or touch applied to touchpad 214. In order to allow a user to feel the forces produced or output by haptic actuator 222, pressure-sensitive suspension systems in accordance with embodiments hereof are installed to allow touchpad 214 to have the required compliance for haptic feedback and be moved by the forces output by haptic actuator 222. Thus, pressure-sensitive suspension systems in accordance with embodiments hereof are configured to allow preferential movement of touchpad 214 with respect to housing 216.

In the embodiment of FIG. 4, pressure-sensitive suspension system 220 includes four suspension elements 224 which are positioned or mounted under each of the four corners of touchpad 214. Suspension elements 224 are discrete but identical suspension components that couple touchpad 214 and housing 216 together but it will be understood by those of ordinary skill in the art that more or fewer suspension components may be utilized. For example, in another embodiment hereof (not shown), the haptic device may include a plurality of discrete suspension components extending between touchpad 214 and housing 216 at strategic locations such as but not limited to along one or more edges of the haptic device and/or spaced apart locations under all or a portion of the touchpad. In yet another embodiment hereof (not shown), only one suspension component may extend continuously under all or a portion of the touchpad. Each suspension component 224 extends between touchpad 214 and housing 216. Suspension elements 224 are not required to be adhered or fixed to any other component of the haptic device, but rather are positioned or sandwiched between touchpad 214 and a portion of housing 216. In another embodiment hereof, one surface of each suspension element 224 may be adhered or fixed to an adjacent component of the haptic device.

Figure 5:
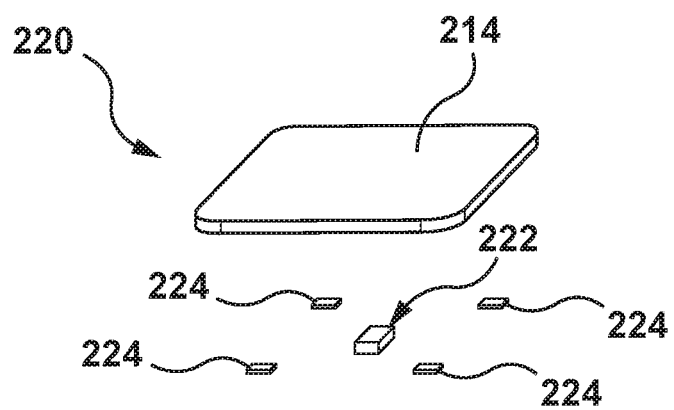
FIG. 5 is an exploded perspective view of the pressure-sensitive suspension system of the laptop computer of FIG. 2.

The suspension function of suspension components 224 will be initially discussed herein, followed by a discussion of the sensor function of suspension components 224. FIG. 5 is an exploded perspective view of the pressure-sensitive suspension system of the laptop computer of FIG. 2. Suspension elements 224 couple touchpad 214 and housing 216 together such that the touchpad is movable relative to the housing. In this embodiment, the forces produced or output by haptic actuator 222 onto touchpad 214 are linear and along the x-axis and/or y-axis, which is in-plane or parallel to the planar surface of touchpad 214. Suspension elements 224 include elastomer 228 which is configured to limit movement between touchpad 214 and housing 216 in at least a first direction (i.e., the z-direction) while also being configured to allow movement of touchpad 214 and housing 216 in at least a second direction (i.e., the x-direction or the y-direction). Elastomer 228 is configured to operate in this manner via selection of the material, thickness, and other properties. In an embodiment hereof, elastomer 228 measures approximately 5 millimeters by 5 millimeters, with a 0.5 millimeter thickness. Exemplary materials for elastomer 228 include but are not limited to silicone, natural rubber and a thermoplastic elastomer (TPE). Elastomer 228 may include an emulsifier to assist in dispersing pressure-sensing particles 226 therein.

Figure 6:
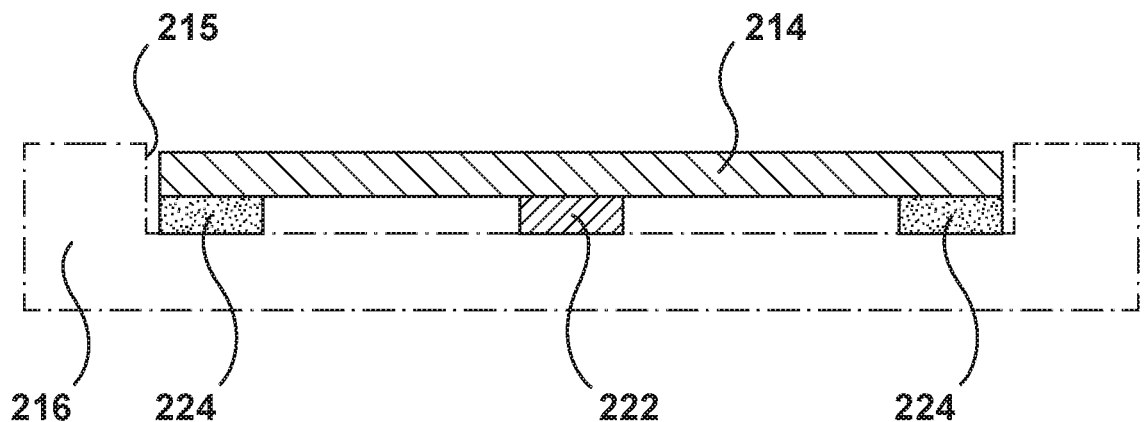
FIG. 6 is a side sectional view of the pressure-sensitive suspension system of the laptop computer of FIG. 2, with the housing thereof shown in phantom.

FIG. 6 is a side view of pressure-sensitive suspension system 220, with housing 216 shown in phantom for illustrative purposes. Due to the material and dimensions of elastomer 228, suspension component 224 permits lateral or side-to-side movement of touchpad 214 along the x-axis and along the y-axis, i.e., in-plane with or parallel to the plane of touchpad 214. In addition, elastomer 228 is sufficiently stiff that upward and downward movement of touchpad 214 along the z-axis, i.e., perpendicular or normal to the plane of touchpad 214, is restricted. Thus, when a user presses down on touchpad 214 during operation thereof, suspension components 224 do not allow movement of touchpad 214 in the direction of the z-axis and as such the user feels as though touchpad 214 is rigidly mounted within housing 216 of computer 210. However, when haptic actuator 222 outputs a force along the x-axis and/or y-axis as will be described in more detail herein, suspension components 224 are compliant along the x-axis and/or y-axis by inducing motion in the plane, shearing to the thickness of elastomer 228, and thus lateral movement of touchpad 214 is permitted in order to provide haptic effects to the user. Thus, suspension components 224 allow a user to feel vibrations, jolts, and similar tactile feedback produced by haptic actuator 222 while simultaneously providing stability to touchpad 214 during user operation thereof. Although suspension components 224 are configured to allow preferential movement along the x-axis and/or y-axis, suspension components may be alternatively configured to allow preferential movement in other directions of actuation, such as along the z-axis, depending on various factors including the type of actuator, how movement will be induced on the suspension component, and the mass of the touchpad.

Figure 7:
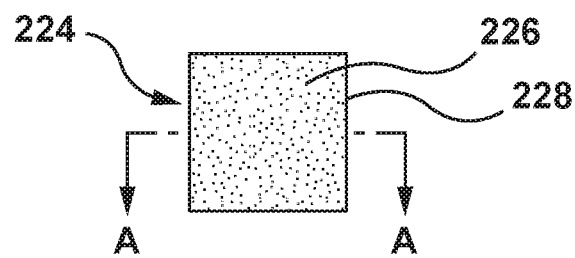
FIG. 7 is an enlarged top view of the suspension component of the pressure-sensitive suspension system of FIG. 6, wherein pressure-sensing particles are suspended within an elastomer in a homogenous mixture.
Figure 7A:
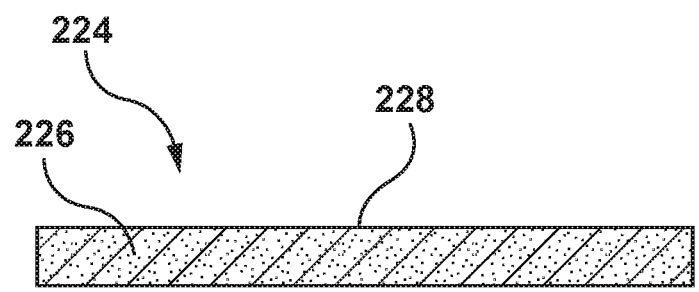
FIG. 7A is a sectional view taken along line A-A of FIG. 7.

The pressure-sensing function of suspension component 224 will now be described with reference to FIG. 7 and FIG. 7A. FIG. 7 is an enlarged top view of suspension component 224 and illustrates how pressure-sensing particles 226 are suspended within elastomer 228 as a homogenous mixture. FIG. 7A is a sectional view taken along line A-A of FIG. 7. In order to form suspension component 224 with pressure-sensing capabilities, suspension component 224 is formed by suspending or dispersing pressure-sensing particles 226 within elastomer 228 during manufacture of suspension component 224. For example, in an embodiment hereof, pressure-sensing particles 226 is a conductive ink material that is mixed with a liquid elastomer such as silicone before curing thereof. As the curing process proceeds, the conductive ink material is suspended in, dispersed within, or otherwise integrated into the elastomer in a homogeneous manner. In addition to conductive ink materials that are responsive to pressure, pressure-sensing particles 226 may be particles of conductive materials including copper, silver, carbon block, graphene, or carbon nanotubes, or may be particles of piezoelectric materials. Suitable conductive ink materials and particles of conductive materials for use in embodiments hereof are commercially available from Peratech Limited of Richmond, North Yorkshire, United Kingdom. As used in the following detailed description and in the claims, pressure-sensing particles being "integrated into" the elastomer should be construed to encompass pressure-sensing particles that are suspended within or dispersed into the elastomer that is integrally formed during manufacture thereof as a single component without the use of adhesive or other coupling mechanisms. In addition, used in the following detailed description and in the claims, pressure-sensing particles being "integrated into" the elastomer should also be construed to encompass pressure-sensing particles being printed onto a surface of the elastomer as described herein with respect to the embodiment of FIGS. 10 and 11.

Pressure-sensing particles 226 are configured to sense pressure applied to touchpad 214. More particularly, when pressure is applied to touchpad 214 and thus applied to suspension elements 224, elastomer 228 having pressure-sending elements 226 integrated therein has a reduced resistance that is measured or detected and then conveyed or transmitted to a processor 218 of computer 210. More particularly, computer 210 includes processor 218 having a memory 219 (see block diagram of FIG. 3). Processor 218 is configured to receive and process a pressure signal from pressure-sensing particles 226 of suspension component 224. Processing circuitry in processor 218 may be implemented using application-specific integrated circuits (ASICs), digital signal processing circuits, microcontrollers, microprocessors, and other circuits. Software such as application code, operating system instructions, and firmware may be used in implementing functions for operating touchpad 214. In an embodiment, control functions performed by processor 218 may be implemented using a combination of hardware and software.

When a user presses downwards on touchpad 214, suspension elements 224 compress and this deflection generates a measurable change in the resistance that serves as an indicator of the amount of force or pressure that is being applied to touchpad 214. Stated another way, suspension elements 224 have a different resistance when compressed than when uncompressed. When suspension elements 224 are not compressed, pressure-sensing particles 226 contact each other to form a first or uncompressed electrical or conductive pathway. An input voltage is supplied to measure the resistance of pressure-sensing particles 226 with the first or uncompressed electrical or conductive pathway via a Wheatstone bridge circuit. In an embodiment, the output may be amplified prior to measurement thereof to obtain a more accurate resistance measurement. When suspension elements 224 are compressed (i.e., when a user applies pressure thereto), the number of pressure-sensing particles 226 participating in the electrical or conductive pathway increases and pressure-sensing particles 226 form a second or compressed electrical or conductive pathway which has a greater conductivity than the first or uncompressed electrical or conductive pathway. Stated another way, the applied pressure increases the number of pressure-sensing particles 226 formed from a conductive material contacting each other and thus electrically connecting to each other. An input voltage is supplied to measure the resistance of pressure-sensing particles 226 with the second or compressed electrical or conductive pathway via a Wheatstone bridge circuit. In an embodiment, the output may be amplified prior to measurement thereof to obtain a more accurate resistance measurement. The measurable change in the resistance between pressure-sensing particles 226 with the first or uncompressed electrical or conductive pathway and pressure-sensing particles 226 with the second or compressed electrical or conductive pathway serves as an indicator of the amount of force or pressure that is being applied to touchpad 214, and thus signals from suspension elements 224 are considered pressure signals herein.

In order for pressure-sensing particles 226 to operate as described above, a concentration of pressure-sensing particles 226 within suspension elements 224 is close to but not greater than a percolation threshold. The percolation threshold is the critical value of concentration when infinite connectivity or percolation first occurs. The value of the percolation threshold is dependent on various factors, including the particle aspect ratio, the matrix viscosity, the degree of dispersion, and the geometry of pressure-sensing particles 226. For instance, low aspect ratio particles have much higher percolation threshold compared with the percolation threshold of high aspect ratio particles. Depending on how close the concentration of pressure-sensing particles 226 is to the percolation threshold, the output signal trend could vary. For instance, if the concentration of pressure-sensing particles 226 is very close to the percolation threshold then the output signal would saturate quickly, resulting in a highly-sensitive touchpad 214. In addition, particles having at least one planar surface are easier to connect or contact each other to form electrical pathway than spherical particles. In an embodiment hereof, pressure-sensing particles 226 include generally planar particles although such geometry is not required. As used herein, generally planar particles include particles having at least one planar surface or side. In an embodiment hereof, all sides or surfaces of pressure-sensing particles 226 are planar.

Each suspension element 224 is further electrically connected to processor 218 in order to convey or transmit its corresponding pressure signal to processor 218. In an embodiment hereof, processor 218 may include calibration module 217 to calibrate signals coming from of pressure-sensing particles 226 to be a standardized pressure signal. For example, calibration module 217 may be used to convert resistance changes output by pressure-sensing particles 226 to corresponding standardized pressure signals. Processor 218 then converts the pressure signal into the position or location of applied pressure (and thus the user's finger or stylus) on touchpad 214. In order to convey or transmit the pressure signal from suspension element 224 to processor 218, conductive layers or tracks (not shown) are disposed on at least one surface of suspension element 224. In an embodiment, conductive layers or tracks are disposed on two opposing surfaces of suspension element 224. Processor 218 may output the location/position of the applied pressure on touchpad 214 as well as the relative strength of the applied pressure. Since there is a plurality of suspension elements 224 (i.e., a sensor element is positioned under each corner of touchpad 214), each suspension element 224 may produce an independent pressure signal depending upon the proximity of the applied pressure. For each applied pressure, pressure signals from suspension elements 224 are simultaneously transmitted to and processed by processor 218. The received pressure signals are combined (e.g., digitally added and/or averaged) and the combined signal may be compared to threshold values to determine the position or location of the user's finger or stylus. In addition to single touch or applied pressures, the received pressure signals from suspension elements 224 can be processed to recognize or determine the presence of more than one points of contact with the surface, i.e., "multi-touch" applied pressures.

Figure 10:
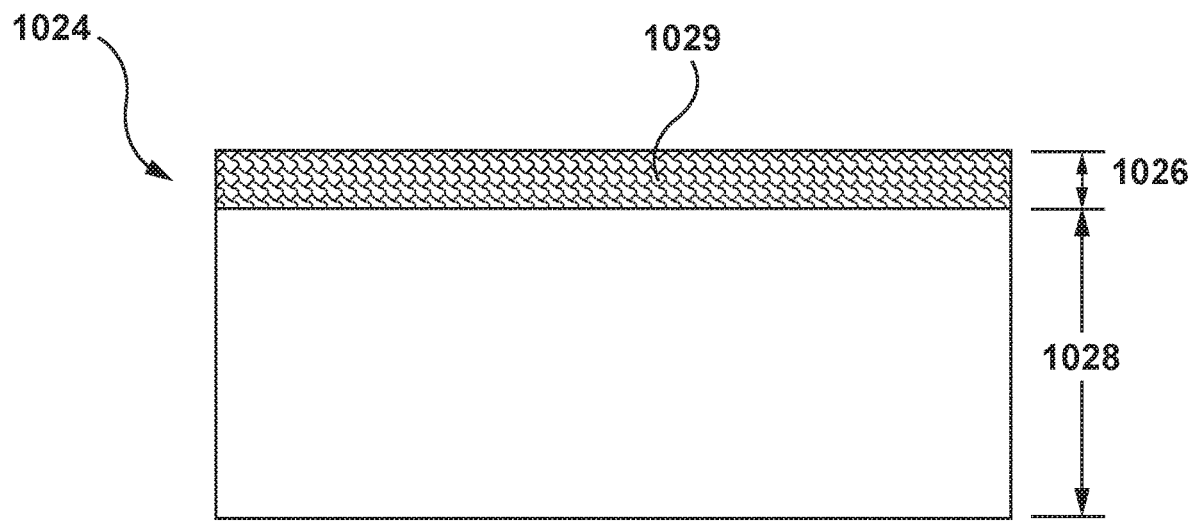
FIG. 10 is an enlarged side view of a suspension component of a pressure-sensitive suspension system according to another embodiment hereof, wherein pressure-sensing particles is printed onto a surface of an elastomer.
Figure 11:
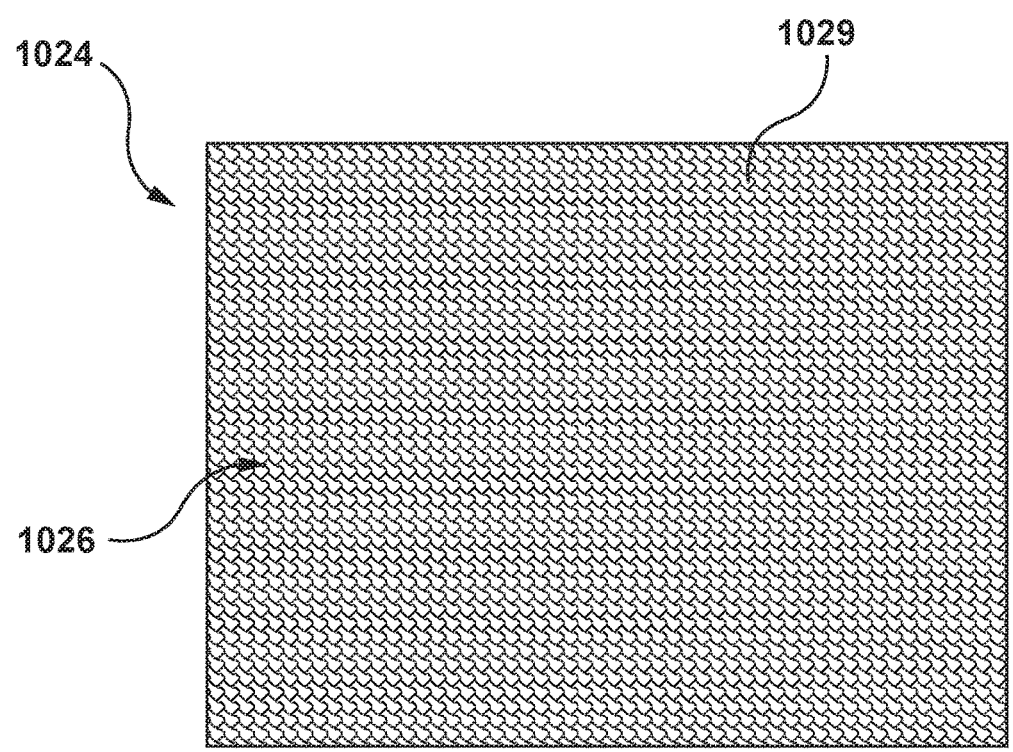
FIG. 11 is a top view of the suspension component of FIG. 10.

FIGS. 10-11 illustrate another embodiment of a suspension element 1024 for use in embodiments hereof. FIGS. 10 and 11 are side and top views, respectively, of suspension element 1024. Rather than being suspended or dispersed into an elastomer, suspension element 1024 includes pressure-sensing conductive ink 1026 that is integrated into an elastomer 1028 by a printing process. In this embodiment, elastomer 1028 is cured and then pressure-sensing conductive ink 1026 is printed onto one or more surfaces of elastomer 1028 in a pattern 1029. When pressure-sensing conductive ink 1026 is printed onto elastomer 1028, pressure-sensing conductive ink 1026 and elastomer 1028 are integrally fused together without the use of adhesive or other coupling mechanism. Pressure-sensing conductive ink 1026 and elastomer 1028 are thus a single component integrally formed during manufacture thereof. Further, since pressure-sensing conductive ink 1026 is printed onto elastomer 1028, it adds minimal thickness to elastomer 1028 to fit within the size constraints associated with a touchpad application. Pattern 1029 includes intentional voids or gaps to improve consistency of the pressure signal output therefrom. The intentional voids or gaps of pattern 1029 do not include pressure-sensing conductive ink 1026 and may allow for adhesion. Pattern 1029 may be configured to effect material use, consistency, and linearity of the pressure signal output therefrom.

Signals from pressure-sensing particles 226 of suspension components 224 are transmitted to a processor 218 of computer 210 in order to generate haptic feedback. Such haptic feedback or effects, also known as tactile feedback, touch feedback, and vibro-tactile feedback, allows for a more intuitive, engaging, and natural experience for the user of computer 210 and thus interaction between the user and touchpad 210 is considerably enhanced through the tactile feedback provided by the haptic effects. More particularly, in addition to being configured to receive and process a pressure signal from pressure-sensing particles 226 of suspension component 224, processor 218 is also configured to output a haptic control signal to haptic actuator 222 in response to the pressure signal. Haptic actuator 222 includes circuitry that receives signals from processor 218 and thus is configured to receive the haptic control signal from processor 218. Haptic actuator 222 may also include any circuitry required to convert the haptic control signal from processor 218 to an appropriate signal for use with haptic actuator 222. Haptic actuator 222 outputs tactile sensations in accordance with the haptic control signals by moving touchpad 214 relative to housing 216 to provide a haptic feedback to a user of touchpad 214. Haptic actuator 222 is coupled to an underside surface of touchpad 214 for providing a haptic effect and since touchpad 214 is directly coupled to haptic actuator 222, any forces produced by the haptic actuator are directly applied to touchpad 214.

Haptic actuator 222 may be any of a number of known actuator types including, without limitation, a piezo actuator driven by suitable electronics, voice coil actuator, an eccentric mass actuator, an E-core type actuator, a solenoid, a moving magnet actuator, or other type of actuator as desired. In an embodiment hereof, haptic actuator 222 is a macro fiber composite (MFC) actuator. It will be understood by one of ordinary skill in the art that the placement of haptic actuator 222 may vary from that shown and is not limited to the location shown in the figures. In the embodiment of FIG. 4, a single haptic actuator 222 is positioned at or near the center of touchpad 214, or off to one side if space constraints of the housing require such a position. In other embodiments, multiple haptic actuators can be positioned at different areas of the touchpad.

Haptic actuator 222 can output a small pulse, vibration, or texture sensation on touchpad 214 and to the user if the user is contacting the touchpad. In an embodiment hereof, forces applied to touchpad 214 via haptic actuator 222 cause side-to-side (e.g., x-y) or lateral motion of touchpad 214 in the plane of its planar surface. A variety of haptic sensations can be output to the user who is contacting touchpad 214. For example, jolts, vibrations (varying or constant amplitude), and textures can be output. Forces output on touchpad 214 can be at least in part based on the location of the finger on touchpad 214 or the state of a controlled object in the graphical environment of computer 210, and/or independent of finger position or object state. Such forces output on touchpad 214 are considered "computer-controlled" since processor 218 or other electronic controller is controlling the magnitude and/or direction of the force output of the actuator(s) using electronic signals. In an embodiment, the entire touchpad 214 is provided with haptic sensations as a single unitary member. In another embodiment, individually-moving portions of touchpad 214 can each be provided with its own haptic feedback actuator and related transmissions so that haptic sensations can be provided for only a particular portion. For example, some embodiments may include a touchpad having different portions that may be flexed or otherwise moved with respect to other portions of touchpad 214.

The frequency of a vibration output by haptic actuator 222 can be varied by providing different haptic control signals to haptic actuator 222. Furthermore, the magnitude of a pulse or vibration can be controlled based on the applied haptic control signal. If multiple haptic actuators 222 are provided, a stronger vibration can be imparted on the touchpad by activating two or more actuators simultaneously. Furthermore, if an actuator is positioned at an extreme end of the touchpad and is the only actuator that is activated, the user may experience a stronger vibration on the side of the touchpad having the actuator than on the opposite side of the touchpad. Different magnitudes and localized effects can be obtained by activating some but not all of the actuators. Since the tip of a user's finger that is touching touchpad 214 is fairly sensitive, the output forces do not have to be of a high magnitude for the haptic sensation to be effective and compelling.

In some embodiments, a separate local processor (not shown) can be provided for touchpad 214 to both report pressure-sensor data to processor 218 and/or to carry out haptic control signals received from processor 218, such commands including, for example, the type of haptic sensation and parameters describing the commanded haptic sensation. Alternatively, the local processor can simply pass streamed data from processor 218 to haptic actuator 222. The local processor can implement haptic sensations independently after receiving a haptic control signal from processor 218 by controlling haptic actuator 222, or processor 218 can maintain a greater degree of control over the haptic sensations by controlling haptic actuator 222 more directly. Architectures and control methods that can be used for reading sensor signals and providing haptic feedback for a device are described in greater detail in U.S. Pat. No. 5,734,373 to Rosenberg et al., assigned to the same assignee of the present disclosure and the disclosures of which is herein incorporated by reference in its entirety.

Figure 8:
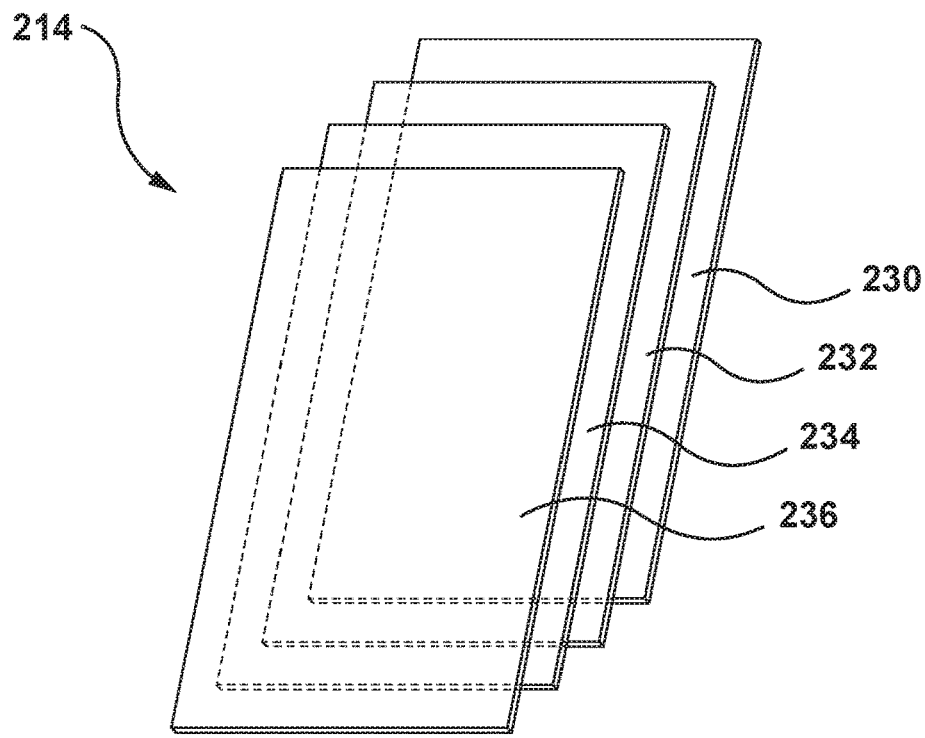
FIG. 8 is an exploded view of the touchpad of FIG. 2, the touchpad being removed from the laptop computer for illustrative purposes only, wherein the touchpad is formed from a layered stack of structures that includes a smooth contact or cover layer, an opaque layer, a layer of pressure-sensitive adhesive, and a stiffening layer.

As known in the art, touchpad 214 is formed from a layered stack of structures. With reference to FIG. 8, an exploded view of touchpad 214 is shown. Touchpad 214 includes a smooth contact or cover layer 230, an opaque layer 232, a layer of pressure-sensitive adhesive 234, and a stiffening layer 236. Cover layer 230 may be formed from glass, plastic, ceramic, or other suitable materials and opaque layer 232 is formed from an opaque ink applied to a surface of cover layer 230 for aesthetic purposes only to obscure internal structures from view. Stiffening layer 236 may be formed form metal (e.g., stainless steel, aluminum, titanium, etc.), glass, ceramic, carbon-fiber composites, plastic, or other suitable materials. Stiffening layer 236 ensures that touch or contact activity is detected by touchpad 214 regardless of the location at which the user presses cover layer 230. In this embodiment, only suspension components 224 including pressure-sensing particles 226 detect or sense touch or contact activity onto touchpad 214.

Figure 9:
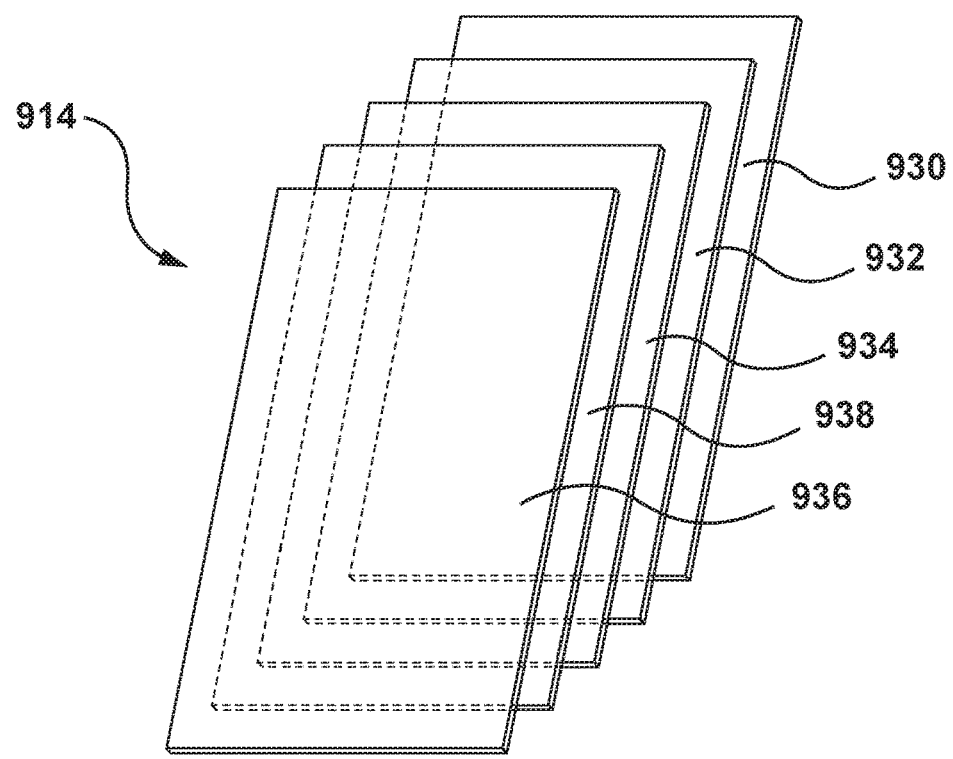
FIG. 9 is an exploded view of a touchpad according to another embodiment hereof, the touchpad being removed from the laptop computer for illustrative purposes only, wherein the touchpad is formed from a layered stack of structures that includes a smooth contact or cover layer, an opaque layer, a layer of pressure-sensitive adhesive, a stiffening layer, and a position sensor array for detecting touch or contact activity onto the touchpad.

In another embodiment hereof shown in FIG. 9, in addition to suspension components 224 including pressure-sensing particles 226, touchpad 914 also includes a position sensor or position sensor array 938 for detecting touch or contact activity onto touchpad 914. With reference to FIG. 9, an exploded view of touchpad 914 is shown. Touchpad 914 includes a smooth contact or cover layer 930, an opaque layer 932, a layer of pressure-sensitive adhesive 934, position sensor array 938, and a stiffening layer 936. Cover layer 930, opaque layer 932, and stiffening layer 936 is similar to cover layer 230, opaque layer 232, and stiffening layer 236 described above with respect to FIG. 9. Position sensor array 938 includes an array of position sensors configured to measure the position of a user's finger or stylus with respect to the X and Y lateral dimensions of touchpad 214. Examples of position sensors that may be used to provide touchpad 214 with position sensing capabilities include capacitive sensors, resistive sensors, surface acoustic wave sensors, optical sensors (e.g., an array of light sensors for a shadow-based sensor that detects position by measuring ambient-light shadows produced by external objects), or other suitable position positions. Capacitive position sensors sense the location of an object on or near the surface of the touchpad based on capacitive coupling between capacitors in the touchpad and the object. Capacitive position sensors, for example, may be a printed circuit board or other substrate on which an array of electrodes is formed. Resistive position sensors are pressure-sensitive and detect the pressure of a finger, stylus, or other object against touchpad 214 when the applied pressure causes conductive layers, traces, switches, etc. in touchpad 214 to electrically connect. In addition to processing signals from pressure-sensing particles 226 of suspension components 224 to determine position or location of touch or contact events, signals from position sensor array 938 may also be processed to determine the position or location of touch or contact events on touchpad 214 in order to enhance the precision of the position/location determination and thus pinpoint the position/location of the touch or contact events.

Figure 12:
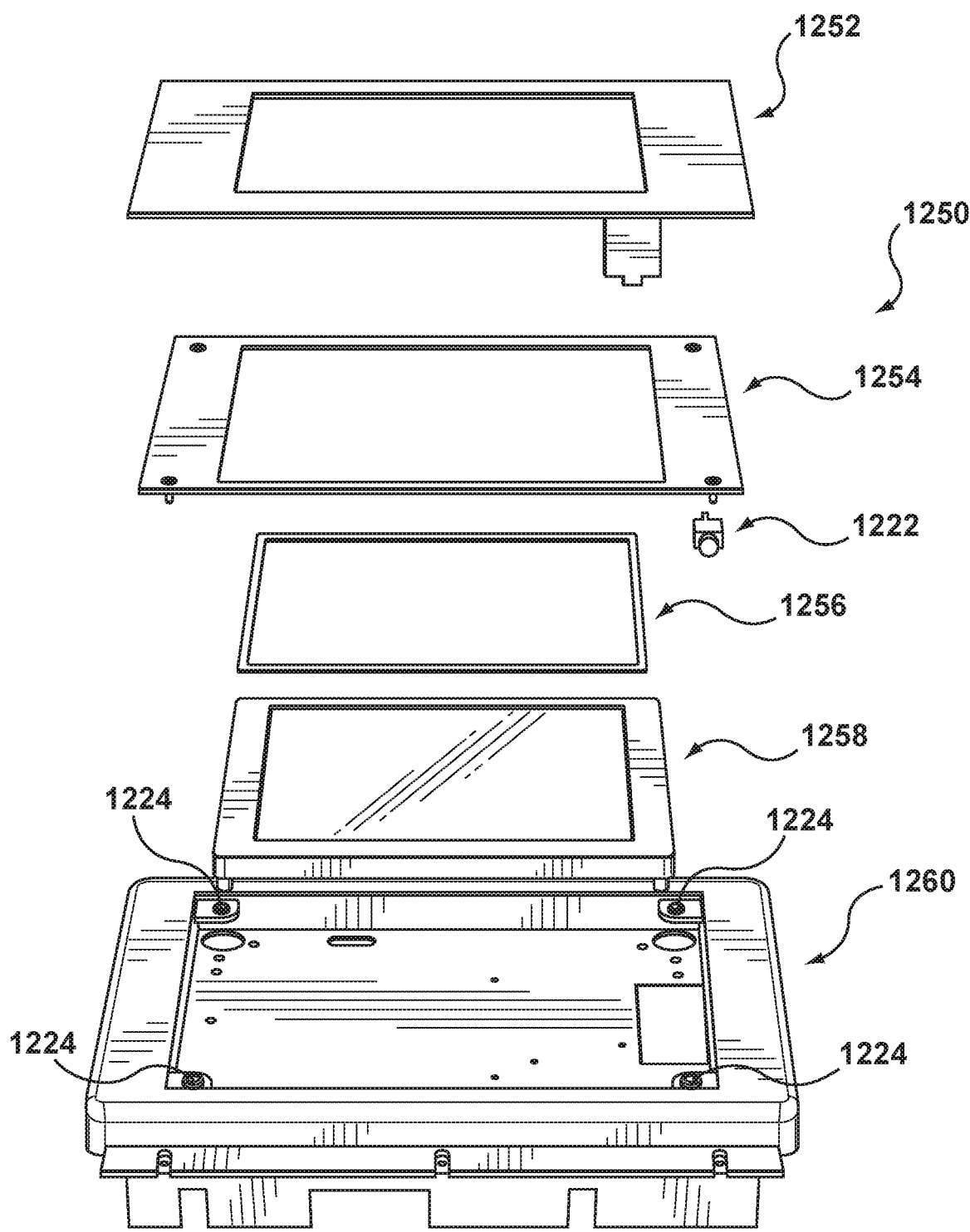
FIG. 12 is an exploded perspective view illustrating various components of a mobile haptic device for providing haptic feedback, wherein the mobile haptic device includes a pressure-sensitive suspension system according to an embodiment hereof.

As previously described, although the embodiments above describe a touchpad application, pressure-sensitive suspension systems may also be utilized in any haptic touch surface that includes fixed and floating elements such as touchscreens of computers, touchscreens for mobile devices, touch components of gaming controllers or peripherals including isovibe applications in which an isolated section of peripheral is provided with haptic feedback, automotive touchscreens, and button panels with haptics such as but not limited to automobiles and consumer electronics or appliances. For example, FIG. 12 is an exploded perspective view illustrating various components of a mobile device having a touchscreen with haptic feedback, the mobile haptic device including a pressure-sensitive suspension system according to an embodiment hereof. FIG. 12 illustrates a mobile haptic device 1250 for providing haptic feedback to a touchscreen 1252 that utilizes a plurality of suspension elements 1224 which are similar to suspension elements 224 described herein and include pressure-sensing particles suspended within or dispersed within an elastomer. In addition to touchscreen 1252, mobile haptic device 1250 includes a carrier 1254, a motor or haptic actuator 1222, a dust seal 1256, an LCD component 1258, and a main housing 1260. Mobile haptic device 1250 provides haptic feedback to the user similarly to touchpad 214 described in previous embodiments. Haptic actuator 1222 coupled to the underside of the touchscreen 1252 provides haptic feedback such as pulse, vibrations, and texture. The user can experience the haptic feedback through a finger or a held object such as a stylus that is contacting touchscreen 1252. Suspension elements 224 couple touchscreen 1252 and main housing 1260 together such that the touchscreen is movable relative to the main housing to provide a suspension function during haptic feedback and also provides a pressure-sensing function as well. Mobile haptic device 1250 may be any of a number of devices having a touchscreen or touch panel such as, for instance, a tablet computer, cellular telephone, PDA, portable gaming device, media player, a printer, an office telephone, or the like. In an embodiment, mobile haptic device 1250 may be a medical device with a seven inch touchscreen display, for instance.

While various embodiments have been described above, it should be understood that they have been presented only as illustrations and examples of the present invention, and not by way of limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:

1. A haptic device comprising:
   a housing;
   a touch surface component mounted to the housing to be movable relative thereto; a haptic actuator coupled to the touch surface component for providing haptic feedback to the touch surface component;
   at least one suspension component disposed between the touch surface component and the housing, wherein the at least one suspension component is formed from an elastomer and includes pressure-sensing particles integrated into the elastomer, the pressure-sensing particles being configured to sense pressure applied to the touch surface component; and
   a processor configured to
      receive a pressure signal from the pressure-sensing particles,
      output a haptic control signal to the haptic actuator in response to the pressure signal, and
      determine a location of the pressure applied on the touch surface component based only on the pressure signal.

2. The haptic device of claim 1, wherein the at least one suspension component couples the touch surface component and the housing together such that the touch surface component is movable relative to the housing and the haptic feedback includes moving the touch surface component relative to the housing.

3. The haptic device of claim 1, wherein the pressure-sensing particles are a conductive ink material.

4. The haptic device of claim 3, wherein the conductive ink material is printed onto a surface of the elastomer.

5. The haptic device of claim 1, wherein the pressure-sensing particles are suspended within the elastomer in a homogeneous mixture.

6. The haptic device of claim 1, wherein the touch surface component is one of a touchscreen and a touchpad.

7. The haptic device of claim 1, wherein the at least one suspension component is configured to limit movement between the touch surface component and the housing in at least a first direction while also being configured to allow movement of the touch surface component relative to the housing in a second direction.

8. The haptic device of claim 1, wherein the suspension component is spaced apart and distinct from the haptic actuator.

9. The haptic device of claim 1, wherein the processor includes a calibration module to calibrate the pressure signal from the pressure-sensing particles into a standardized pressure signal.

10. The haptic device of claim 1, wherein the at least one suspension component includes a plurality of suspension components and the processor is configured to receive pressure signals from each suspension component.

11. The haptic device of claim 10, wherein the processor is also configured to determine a relative strength of the pressure applied on the touch surface component in response to the pressure signals from each suspension component.

12. The haptic device of claim 10, wherein the processor is configured to determine multi-touch applied pressures.

13. A compliant suspension system for a haptic device comprising:
   a first body;
   a second body mounted to the first body to be movable relative thereto; a haptic actuator for moving the second body relative to the first body and thereby provide a haptic feedback to the second body;
   at least one suspension component disposed between the first body and the second body, wherein the at least one suspension component includes an elastomer element having pressure sensing particles integrated therewith, the pressure-sensing particles being configured to sense pressure applied to the second body; and
   a processor configured to
      receive a pressure signal from the pressure-sensing particles,
      output a haptic control signal to the haptic actuator in response to the pressure signal, and
      determine a location of the pressure applied to the second body based only on the pressure signal.

14. The compliant suspension system of claim 13, wherein the first body is a housing and the second body is one of a touchscreen and a touchpad.

15. The compliant suspension system of claim 13, wherein the pressure-sensing particles are a conductive ink material, the conductive ink material is printed onto a surface of the elastomer element, or the pressure-sensing particles are suspended within the elastomer element in a homogeneous mixture.

16. The compliant suspension system of claim 13, wherein the at least one suspension component includes a plurality of suspension components and the processor is configured to receive pressure signals from each suspension component, and wherein the processor is also configured to determine a relative strength of the pressure applied on the second body in response to the pressure signals from each suspension component.

* * * * *